United States Patent [19]

van Aalst

[11] Patent Number: 4,701,080
[45] Date of Patent: Oct. 20, 1987

[54] TRANSFER SYSTEM FOR DRY FLOWABLE MATERIAL

[75] Inventor: Gerhardt van Aalst, Koudekerk aan den Rijn, Netherlands

[73] Assignee: Cyclonaire Bulk Cargo Systems, Inc., Henderson, Nebr.

[21] Appl. No.: 707,770

[22] Filed: Mar. 4, 1985

[51] Int. Cl.[4] .................................................. B65G 53/28
[52] U.S. Cl. ..................................... 406/109; 55/334; 55/337; 406/171
[58] Field of Search ................. 406/109, 146, 14, 138, 406/171, 172, 173, 163; 55/334, 337, 459, 215, 287

[56] References Cited

U.S. PATENT DOCUMENTS

| | | | |
|---|---|---|---|
| 2,891,782 | 6/1959 | Blackman et al. | 406/146 X |
| 3,069,205 | 12/1962 | McIver et al. | 406/172 X |
| 3,169,038 | 2/1965 | Pendleton | 406/172 |
| 3,179,378 | 4/1965 | Zenz et al. | 406/138 X |
| 3,424,501 | 1/1969 | Young | 406/109 |
| 3,489,464 | 1/1970 | Delfs | 406/109 X |
| 3,937,521 | 2/1976 | Reuter | 406/109 X |

FOREIGN PATENT DOCUMENTS

| | | | |
|---|---|---|---|
| 781022 | 5/1935 | France | 55/287 |
| 48306 | 6/1983 | Japan | 406/146 |

Primary Examiner—Jeffrey V. Nase
Attorney, Agent, or Firm—Welsh & Katz, Ltd.

[57] ABSTRACT

A system for transferring dry flowable material includes a substantially closed transfer vessel adapted to have particulate material drawn therein by a suction line during a fill cycle and discharge the material upon selective pressurizing of the vessel. A filter containment housing is integral with the pressure vessel and houses a filter element arrangement internally of the vessel to filter particulate material from air drawn to the suction line while optimizing the material capacity of the transfer vessel. Pneumatic pressure is introduced to the upper and lower ends of the transfer vessel to establish a predetermined pressure differential across a lower fluid pressure inlet, and provision is made to effect a dual action cleaning of the filter elements so as to maintain optimum efficiency. A bypass system is operative to maintain a predetermined design pressure within the vessel.

3 Claims, 7 Drawing Figures

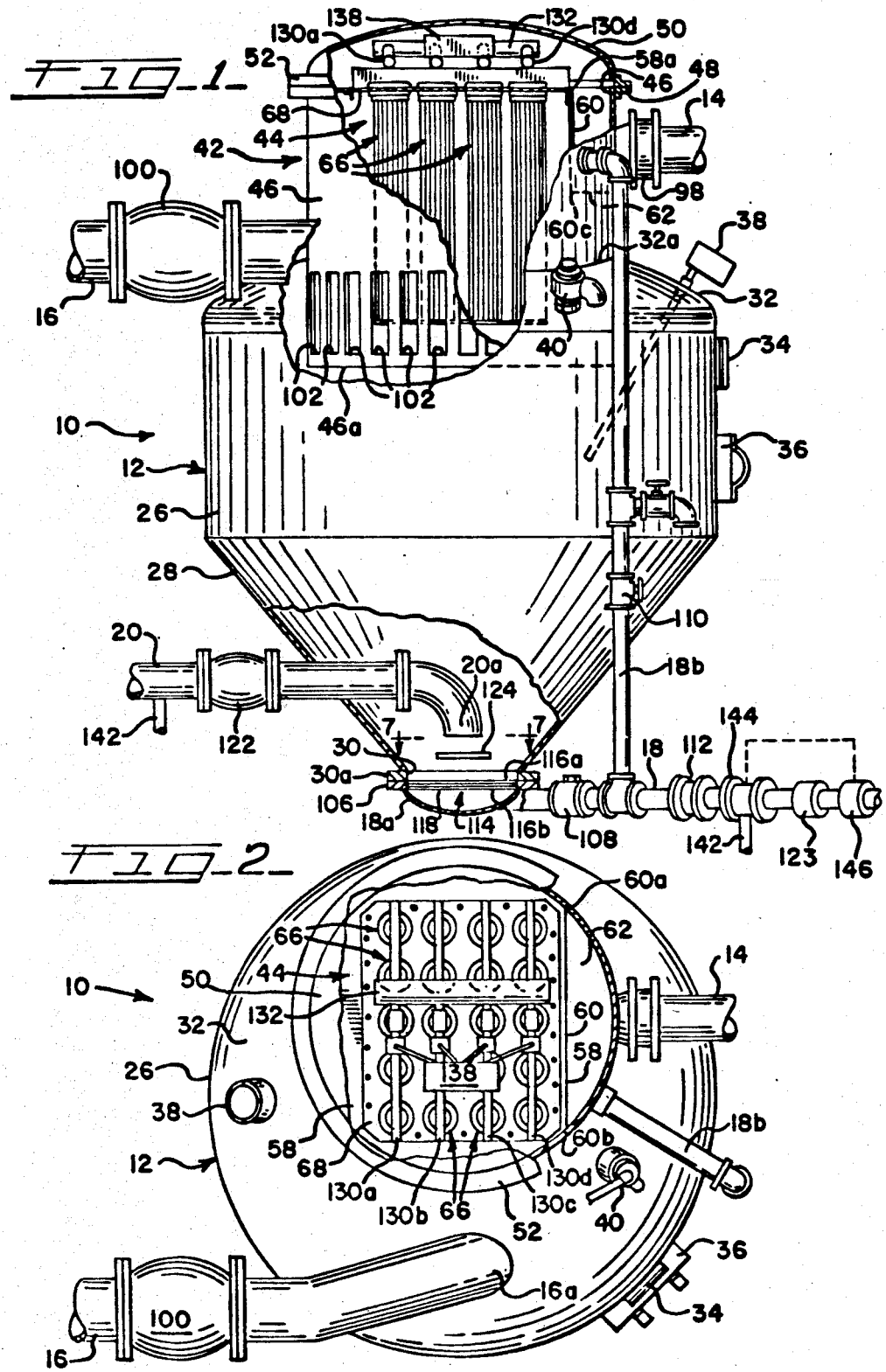

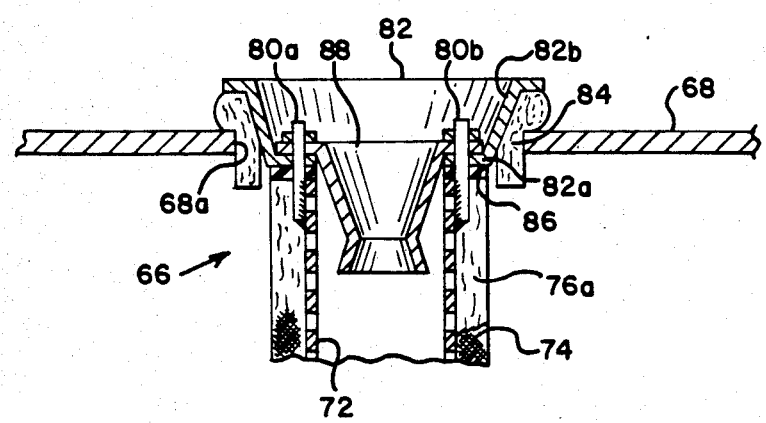
FIG-6-
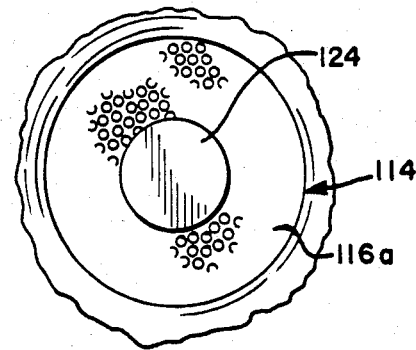
FIG-7-
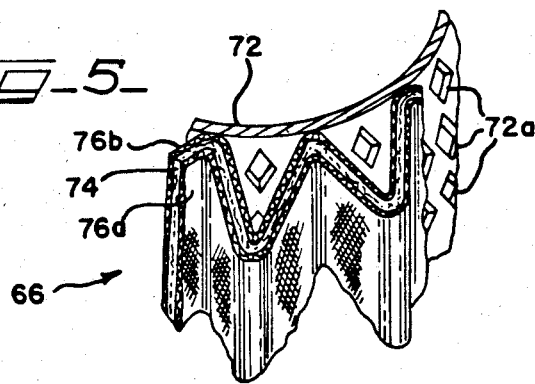
FIG-5-

TRANSFER SYSTEM FOR DRY FLOWABLE MATERIAL

BACKGROUND OF THE INVENTION

The present invention relates generally to systems for transferring dry free flowing bulk materials in the form of particulate or pulverulent materials or the like, and more particularly to a novel transfer vessel for use in such systems.

Systems for transferring bulk products such as dry flowable particulate or pulverulent materials are generally known. Such systems find particular application in conveying bulk materials such as cement, ash, soot, powdered minerals, flour, and coal dust and the like, and generally employ a substantially closed transfer vessel or tank having an inlet opening through which the particulate material may be drawn from a source, such as the hold of a ship or a railcar, after which the flowable material is discharged at a discharge outlet for transfer by way of a pneumatic flow line or the like to a different location such as a storage silo. See, for example, U.S. Pat. No. 3,372,958 to R. R. Black and U.S. Pat. No. 3,861,830 to R. D. Johnson. The systems disclosed is these patents operate on the principle of creating a vacuum or suction within the vessel to effect input loading of flowable particulate material into the vessel until the vessel is substantially full at which time a positive fluid pressure is introduced into the vessel so as to force the material from a discharge outlet into a discharge line in which the material is pneumatically conveyed to a remote storage or production facility. Such filling and discharge of the vessel is generally effected automatically in an alternating cyclical manner by means of a valving control arrangement operative to alternately apply suction and pneumatic pressure to the vessel.

A significant drawback or disadvantage found in many of the known pneumatic conveying systems of the aforedescribed type employing substantially closed transfer vessels or tanks is that rather complex valving and associated flow conduits or lines are generally mounted on and externally of the pressure vessel and extend upwardly therefrom so as to significantly inhibit transportability of the vessels without undertaking substantial disassembly. This is due in part to regulations limiting the over-the-road height for vehicles and associated loads due to viaducts and overpasses and the like found in contemporary highway systems.

Another significant drawback in the prior pneumatic conveying systems employing transfer vessels as aforedescribed is that, to the extent they employ filter arrangements internally of the transfer vessel to prevent entry of particulate material into the suction line, such filter arrangements substantially diminish the effective useful volume or load capacity within the vessel, thus substantially reducing the efficiency of the corresponding conveying system.

Still another drawback in the prior pneumatic conveying systems which employ transfer vessels of the aforedescribed type is that they fail to suitably maintain a predetermined uniform design pressure within the transfer vessel. Because of this, the pressure within the vessel undergoes substantial variations with the result that the conveying efficiency of the transfer vessel is substantially less than optimum which leads to significantly increased cost per unit of material transferred.

SUMMARY OF THE INVENTION

A general object of the present invention is to provide a pneumatic transfer system for use in conveying or transferring particulate material and the like, and which includes a novel transfer vessel adapted to provide substantially improved operational efficiency over prior pneumatic transfer systems.

A more particular object of the present invention is to provide a transfer system for dry flowable particulate material which includes a transfer vessel adapted to effect cyclical filling and discharge of particulate material, and which includes a novel filter arrangement internally of the transfer vessel for filtering particulate material or particles from air drawn out through a suction line, the filter arrangement being configured to maintain optimum filtering while maximizing material capacity efficiency in the vessel.

A feature of the particulate material transfer vessel in accordance with the present invention lies in the provision of a plurality of filter elements supported within a filter containment housing formed integral with the transfer vessel housing, and the connection of a fluid pressure inlet line to the filter containment housing so as to effect the flow of fluid pressure outwardly through the filter elements during pressurizing and discharge cycles of the transfer vessel and thereby create a dual cleaning action on the filter elements when coupled with the periodic passage of compressed air jet pulses outwardly through the filter elements during filling of the transfer vessel, whereby to maintain optimum efficiency of the filter elements.

Another feature of the transfer vessel in accordance with the invention lies in the provision of a filter containment housing integral with the transfer vessel housing and having filter elements supported therein internally of the transfer vessel, the filter containment housing being configured to prevent direct impingement of air entrained particulate material with the filter elements during filling of the vessel, and wherein the filter containment housing is further configured to optimize the filling capacity of the vessel.

Another feature of the particulate material transfer system in accordance with the present invention lies in the provision of a modulating bypass arrangement operative to selectively bypass fluid inlet pressure from the transfer or pressure vessel directly to the material discharge line downstream from the vessel so as to maintain a predetermined design pressure within the transfer vessel and prevent plugging of the discharge line.

A feature of the transfer vessel in accordance with the present invention lies in the connection of a fluid pressure inlet conduit to the vessel at both the upper and lower ends thereof so as to establish a positive differential pressure across an aeration pad at the lower fluid pressure inlet sufficient to maintain fluidization of particulate material at the discharge line entry end and prevent ratholing of the particulate material.

Further objects, features and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is an elevational view of a pneumatic transfer system in accordance with the present invention for use with dry flowable material, portions being broken away for purposes of clarity;

FIG. 2 is a plan view of the pressure vessel illustrated in FIG. 1, but with the filter containment housing cover lid removed and with portions broken away for clarity;

FIG. 5 is a fragmentary perspective view illustrating a section of a filter cartridge as employed in the filter arrangement illustrated in FIGS. 3 and 4;

FIG. 6 is a fragmentary longitudinal sectional view through the upper end of one of the filter cartridges and illustrating one embodiment for supporting the filter cartridges from the tubesheet; and FIG. 7 is a transverse sectional view taken substantially along line 7—7 of FIG. 1 and illustrating the aeration pad and overlying deflection plate in plan view.

DETAILED DESCRIPTION OF PREFERRED EMBODIMENT

Figure 3:
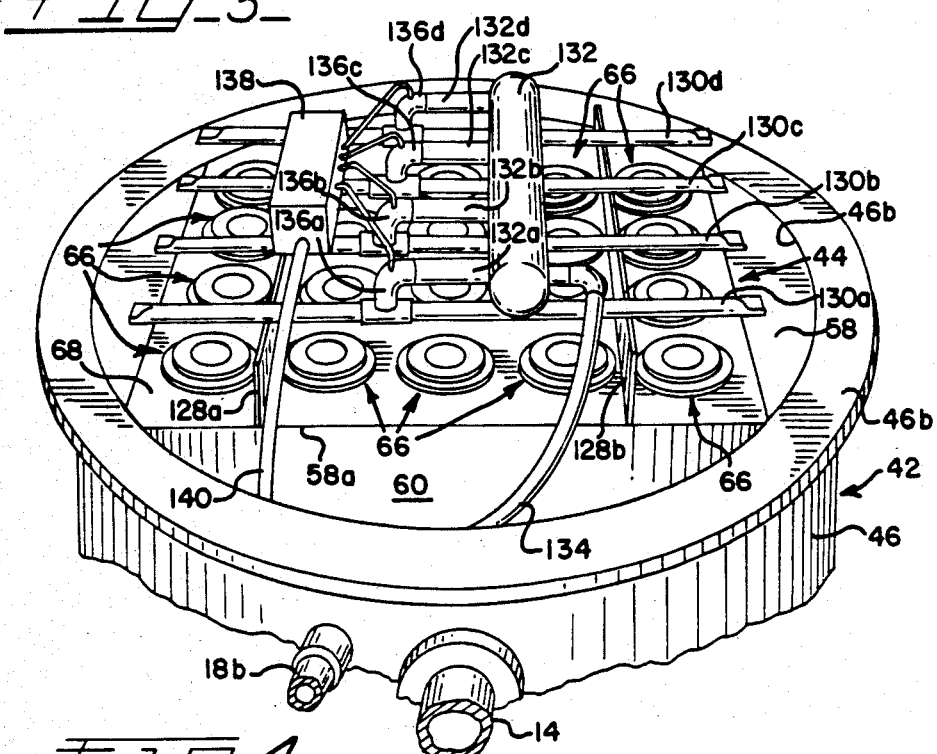
FIG. 3 is a fragmentary perspective view, on an enlarged scale, illustrating the upper end of the filter containment housing with the closure lid removed to expose the filter element tube sheet and associated components.

Referring now to the drawings, and in particular to FIGS. 1 and 2, a transfer system for use with dry flowable materials, such as particulate or pulverulent materials and the like, is indicated generally at 10. The transfer system 10 is particularly adapted to effect transfer of such flowable materials from a remote source, such as the hold of a ship or a railcar, to a different remote location, such as a storage or production facility. Very generally, the transfer system 10, which may alternatively be termed a pneumatic or fluid pressure transfer system, operates on the principle of creating a vacuum or suction within a transfer or pressure vessel, indicated generally at 12, by means of a vacuum or suction line or conduit 14 so as to effect input loading of flowable particulate or pulverulent material into the transfer vessel from a material inlet line or conduit 16 until a predetermined material level is reached within the vessel. Positive fluid pressure is then introduced into the vessel from a fluid pressure inlet line 18 so as to effect discharge of the particulate material through a material discharge or outlet line or conduit 20 in which the material is conveyed by fluid pressure to a remote storage or production facility. As used herein, fluid pressure refers to pneumatic pressure, although gases other than air could be employed as the transfer medium if desired.

The transfer or pressure vessel 12 is particularly adapted for mounting on a portable carrier platform or the like to facilitate transport to selective locations, and may be readily interconnected in tandem with another similar transfer vessel for control through a common fluid pressure and vacuum control system such that particulate material may be drawn into one of the transfer vessels from a remote source while the other transfer vessel is effecting discharge therefrom, whereafter the operating cycles of the transfer vessels are reversed such that continual material transfer is effected. An example of such a system is disclosed in the copending application of Gerhardt Van Aalst, Ser. No. 707,760 filed Mar. 4, 1985.

The transfer vessel 12 has a generally cylindrical intermediate annular wall 26 integrally connected to the upper edge of a lower frustoconical wall 28 which terminates at its lower end in a circular fluid pressure entry opening 30. An annular flange 30a is secured peripherally of the opening 30 and serves as a connecting flange for a lower fluid pressure inlet connection 18a as will be described. The upper peripheral edge of the annular wall 26 is formed integral with a generally dome-shaped upper end wall 32.

The transfer vessel 12 is preferably made of a suitable metallic material and defines an internal chamber having a frustoconical lower end such that particulate or pulverulent material introduced into the upper end of the vessel is urged toward the lower end by gravity. The transfer vessel preferably includes means (not shown) enabling it to be supported on a mobile transport vehicle or at a stationary site such that the longitudinal axis of the internal chamber is substantially vertical. Preferably a sight glass 34 is mounted on the annular wall 26 to facilitate visual observation of the internal chamber. An access porthole is formed in the annular wall 26 and has a removable cover 36 affixed thereover to facilitate access to the internal chamber of the transfer vessel housing for maintenance or other purpose. A level sensor 38 of conventional design is supported on the upper dome wall 32 and extends downwardly within the internal chamber of the pressure vessel for sensing the level of particulate material within the pressure vessel. A conventional pressure relief valve 40 is also preferably mounted on the upper wall 32.

In accordance with one feature of the invention, a filter containment housing, indicated generally at 42, is formed integral with the upper wall 32 of the transfer vessel 12 and houses a filter element arrangement, indicated generally at 44, internally of the vessel so as to filter particulate material from the fluid medium, such as air, which is drawn into the vacuum line 14 during a fill cycle. The filter containment housing 42 includes a generally cylindrical annular wall 46 which extends downwardly through and is integrally secured to the periphery of a suitable opening 32a in the upper vessel wall 32, as by welding, such that the center axis of annular wall 46 is substantially parallel to the longitudinal axis of the transfer vessel 12. The annular wall 46 terminates at its lower end in an annular edge surface 46a which, as shown in FIG. 1, extends slightly downwardly into the internal transfer vessel chamber within the annular wall 26. The upper end 46b of the annular wall 46 has a radial flange 48 secured thereto which serves as a mounting flange for attachment of a removable cover lid 50 having an annular flange 52 adapted for mounting relation with flange 48 through suitable means such as mounting studs or bolts (not shown).

In accordance with another feature of the present invention, the vacuum line 14 is connected in generally normal relation to the annular wall 46 of the containment housing 42 adjacent the upper end thereof. A planar support plate 58 is affixed within the upper end 46b of the filter containment housing so as to lie substantially normal to the longitudinal axis of the filter housing. The mounting plate 58 has an arcuate outer edge which extends about approximately three-fourths of its outer circumference and is sealingly secured internally of the annular wall 46 as by welding or the like. A generally rectangular planar baffle plate 60 is secured along an upper edge to a corresponding edge 58a of the mounting plate 58 and extends vertically downwardly within the filter containment housing as illustrated in FIG. 1. The opposite end edges 60a and 60b of the baffle plate 60 are secured, as by welding, to the inner surface of the annular wall 46, and a lower horizontal edge 60c is secured to or formed integral with a corresponding edge of an arcuate shaped plate 62 having its arcuate edge sealingly secured to the inner surface of the annular wall 46. In this manner, a chamber is created within the upper end of the filter containment housing which is in flow communication with the vacuum line 14.

As aforementioned, the filter arrangement 44 is mounted with the filter containment housing 42 so as to be interposed between the vacuum line 14 and the inlet end 16a of the material inlet line or conduit 16. The material inlet line 16 intersects the upper wall 32 of the pressure vessel 12 such that the particle entrained air stream enters the transfer vessel substantially tangentially to the upper end wall 32 and cylindrical side wall 26. The filter arrangement 44 includes a plurality of filter cartridges, each of which is indicated generally at 66, which take the form of generally cylindrical tubular filter cartridges having closed bottom ends. The filter cartridges 66 are supported by a generally planar metallic tube sheet 68 which is mounted on the mounting plate 58, as by suitable studs and nuts, and sealed at the periphery thereof. The filter cartridges are supported so as to extend downwardly in parallel relation within a suitable rectangular opening formed in the mounting plate 58. In the illustrated embodiment, twenty filter cartridges 66 are supported by the tube sheet 68 in four parallel rows of five equally spaced filter cartridges each.

As illustrated in FIG. 5, each of the filter cartridges 66 includes a cylindrical tubular perforated core or sleeve 72 which may be formed as a rigid expanded metal sleeve so as to define a plurality of apertures or openings 72a spaced generally uniformly throughout the full surface area of the sleeve. Secured about the outer peripheral surface of each perforated sleeve 72 is a pleated composite filter element which, in the illustrated embodiment, takes the form of a sheet of cloth filter material 74, such as a suitable polyester filter cloth, sandwiched between two layers of fine mesh screen 76a and 76b. The screen layers 76a, b may, for example, be formed from a suitable epoxy-coated woven fabric screen cloth having 18 warp and 14 weft threads per square inch. The sandwiched layup of layers 74, 76a and 76b are folded into pleats approximately 1¼ inches deep based on a nominal filter diameter of approximately five inches so as to obtain approximately three pleats per circumferential inch of the filter element. Based on a filter length of approximately 36 inches, a filter area of approximately 20 square feet can be obtained for each filter cartridge.

The filter cartridges 66 are each supported within a corresponding circular opening in the tube sheet 68 such that the filter cartridges depend from the tube sheet in parallel predetermined spaced relation. FIG. 6 illustrates one embodiment for mounting the filter cartridges on the tube sheet 68 wherein the expanded metal sleeve or core 72 has a plurality of threaded mounting shafts affixed about its upper peripheral surface, two of which are indicated at 80a and 80b. The threaded mounting shafts 80a and 80b extend through suitable openings formed in a horizontal annular mounting flange 82a of an annular filter support member or cup 82. Each of the filter cartridge support cups 82 has a generally frustoconical wall 82b which is received downwardly within an annular fabric or cloth cuff 84 which, in turn, is received within a corresponding circular opening 68a in the tube sheet 68. The filter support cup 82 is sized so as to form a friction mounting with the fabric cuff 84 within the tube sheet opening 68a but enables removal of the support cup and associated filter element from the tube sheet. An annular seal 86 is interposed between the upper end of the filter element and the support cup flange 82a so as to obtain a fully sealed mounting of each filter cartridge within the tube sheet 68.

In the embodiment illustrated in FIG. 6, each of the filter cartridges 66 includes a venturi orifice or tube 88 supported within its upper end which serves to increase the radial dispersion of a compressed air jet passed downwardly through the venturi during pulse jet cleaning of the filter elements, as will be described. The filter cartridges 66 may each be releasably supported by the tube sheet 68 in any suitable alternative manner such as through a threaded coupling type mounting or through a bayonet type mounting arrangement.

Figure 4:
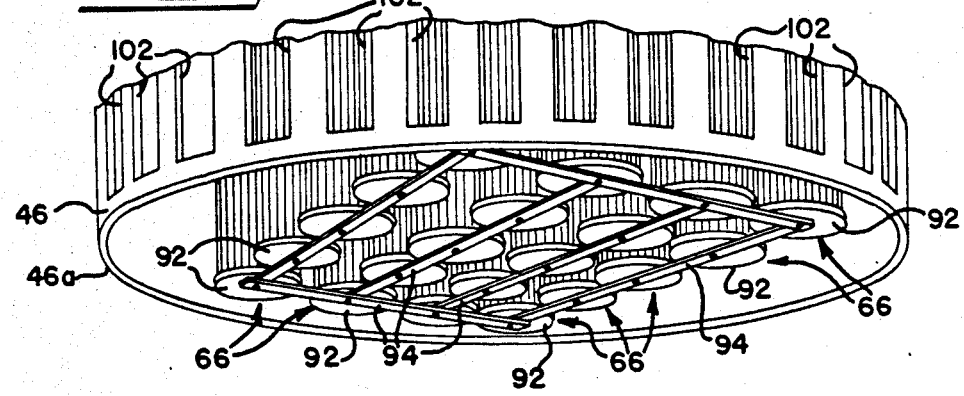
FIG. 4 is a fragmentary perspective view of the filter containment housing and associated internal filter cartridges as viewed from the lower ends thereof within the transfer vessel.

Referring to FIG. 4, each of the filter cartridges 66 preferably has a closed dish-shaped cover or end plate 92 affixed over the lower end of the corresponding filter element, as by being secured to the lower edge of the associated metallic sleeve or core 72, so as to close the lower end of the filter cartridge. A rigid framework 94 of suitably connected strap members may be secured to the lower end covers 92 on the filter cartridges 66 so as to stabilize the lower ends of the filter cartridges when subjected to differential pressure acting on the filter elements during a full cycle of the transfer vessel 12.

With the filter cartridges 66 thus releasably mounted on and suspended from the tube sheet 68, it will be appreciated that the upper open ends of the filter cartridges are in open communication with an isolated chamber formed at the upper end of the filter containment housing defined by the cover lid 50, the tube sheet 68 and mounting plate 58, and the baffle plate 60 and end plate 62. Since the vacuum line 14 communicates with this isolated chamber generally above the filter cartridges 66, it is seen that the filter elements are interposed between the inlet end 16a of the material inlet line 16 and the vacuum line 14 so as to filter any material particles from the air drawn into the vacuum line from the inlet line during the fill cycle. A suction control valve 98 is connected in the vacuum line 14 to facilitate selective application of suction to the transfer vessel during filling of the vessel, and a similar control valve 100 is connected in the inlet line 16 to enable selective opening and closing of the material inlet conduit.

To facilitate filling of the transfer vessel 12 during a fill cycle so as to leave a minimum volume of air in the vessel and thereby optimize the material holding capacity of the transfer vessel, a plurality of generally rectangular slots or openings 102 are formed in the annular wall 46 of the filter containment housing 42, as illustrated in FIGS. 1 and 4. The slots 102 facilitate the passage of air into the filter containment housing and through the filter cartridges into the suction line 14 so as to continue to draw a vacuum in the transfer vessel after the level of particulate material reaches the lower edge 46a of the filter containment housing. This enables the transfer vessel 12 to be filled with particulate material to a level slightly above the lower edge 46a of the filter containment housing without causing the filter elements 66 to blind off.

The portion of circumference of the annular wall 46 of the filter containment housing 42 which is generally in the path of air flow from the material inlet end 16a of the inlet line 16 to the suction line 14 is devoid of any of slots or openings 102 so as to prevent direct impingement of particle entrained air with the filter elements during a fill cycle, thus causing any entrained particles which have not previously separated from the air carrier medium to impinge the interposed filter housing wall 46 and drop downwardly into the pressure vessel. It will be appreciated that without the slots or openings 102 in the filter containment housing wall 46, particulate material input into the transfer vessel would substantially cease when the material level reached the lower edge 46a of the filter containment housing.

In accordance with another feature of the invention, the air pressure line or conduit 18 is connected to the transfer vessel 12 so as to introduce fluid pressure at the upper and lower ends of the transfer vessel. To this end, the inlet line 18 has a lower branch terminating at the outlet end 18a which has an annular flange 106 adapted for connection to the annular flange 30a peripherally of the lower inlet opening 30 in the pressure vessel 12. The air pressure inlet line 18 also has an upwardly directed branch 18b which is connected at its upper end to the filter containment housing wall 46 so as to communicate with the aforedescribed isolated upper region or chamber in the filter containment housing in similar fashion to the vacuum line 14. A check valve 108 is connected in the lower branch of the fluid pressure line 18 so as to prevent contaminated or dirty air from entering the pressure inlet conduit from the pressure vessel 12. A suitable control valve 110 is provided in the upwardly extending branch 18b of the pressure inlet line to facilitate control of the volume of air passing upwardly into the upper end of the filter containment housing 42.

A main fluid pressure control valve 112 is connected in the fluid pressure line 18 upstream of the branches 18a, b to enable on-off control of fluid pressure to the transfer vessel. By connecting the pressure inlet conduit 18 to both the top and bottom of the pressure vessel 12, a predetermined positive pressure differential can be created and maintained across an aeration pad 114 mounted within the inlet opening 30 of the pressure vessel 12 such that fluid pressure introduced into the lower end of the pressure vessel passes through the aeration pad. The aeration pad 114 includes a pair of perforated circular metallic plates or sheets 116a and 116b between which is mounted a suitable air permeable filter pad 118. The outer peripheral edge of the sandwich construction thus formed is suitably secured within the fluid pressure inlet conduit end 118a so as to span the inlet opening 30 and cause air entering the pressure vessel to pass through the aeration pad while preventing downward passage of particulate material into the fluid pressure inlet conduit.

By connecting the fluid pressure inlet line 18 to both the upper and lower ends of the pressure vessel 12 and selectively controlling the air pressure introduced into the upper and lower ends of the pressure vessel, a predetermined positive differential pressure, such as 5–10 psi, can be established across the aeration pad 116 so as to maintain upward flow of fluid pressure sufficient to maintain fluidization of particulate material within the pressure vessel and prevent ratholing of the particulate material which tends to prevent proper discharge of material through the outlet conduit 20.

The upstanding branch 18b of the fluid pressure inlet line 18 is sized to limit the airflow to the upper end of the pressure vessel to a rate which establishes the maximum safe allowable differential pressure across the aeration pad assembly 114, thereby providing optimum fluidization but preventing damage to the aeration pad during prolonged usage.

The air pressure introduced through the lower entry end 30 of the pressure vessel 12 serves to fluidize the particulate material in the vessel in preparation for its entry into an entry end 20a of the material outlet line or conduit 20. The inlet end 20a is preferably positioned to directly and centrally overlie the aeration pad assembly 114. The fluid pressure entering the vessel from the inlet line end 18a carries particulate material upwardly into the material outlet line 20 which has an outlet control valve 122 connected therein to enable selective control of flow through the material outlet line. The control valve 122 is maintained in a closed position during pressurizing of the pressure vessel immediately following filling thereof through the vacuum line 14. When a predetermined pressure is reached within the pressure vessel, as detected by a conventional pressure sensor 123 which is connected in the inlet line 18 upstream from the inlet control valve 112 and cooperates with the outlet control valve 122 so as to control opening and closing thereof, the valve 122 opens to initiate a discharge cycle.

Immediately after a fill cycle, a large volume of particulate material exists above the inlet end 20a of the outlet line 20 thereby creating a pressure head which aids in forcing particulate material out of the pressure vessel into the material or outlet line. As the pressure vessel gradually empties, the pressure head is decreased and a tendency exists for air to flow directly from the aeration pad 114 into the inlet end 20a of the outlet line 20 which may lead to the creation of void pockets within the particulate material, termed ratholing. To prevent such direct air flow into the outlet line and thereby preclude ratholing of material within the pressure vessel, a circular planar deflection plate 124 is supported directly over the aeration pad assembly 114 by means (not shown) which do not substantially impede air flow passing upwardly from the aeration pad. The deflection plate 124 is mounted beneath the entry end 20a of the material outlet line 20 in axial alignment therewith, and has a diameter equal to approximately 1–1.25 times the diameter of the outlet line entry end 20a. The deflection plate 124 is preferably positioned parallel to the aeration pad so as to lie no closer than a distance of one-half its diameter and no farther than a distance equal to its diameter above the aeration pad. The deflection plate 124 serves to increase the length of the air flow path from the aeration pad to the material outlet line end 20a and causes particulate material to be forced up into the discharge or outlet conduit throughout substantially the full discharge cycle. This causes the pressure within the outlet conduit 20 to remain at an elevated level so as to decreases the discharge time and increase the overall conveying capacity of the transfer system 10.

In accordance with another feature of the transfer system 10, optimum filtering efficiency of the filter element arrangement 44 is maintained by means of a dual cleaning mechanism which operates during both the fill cycle and during the pressurizing and discharge cycle. To this end, provision (is made for introducing pulse jets of relatively high velocity air into the hollow interiors of the filter cartridges 66 in predetermined intervals and for predetermined pulse duration. As illustrated in FIGS. 1-3, a pair of upstanding support plates 128a and 128b are mounted on the tube sheet 68 and support a plurality of tubular closed end air pipes which, in the illustrated embodiment, include four air pipes 130a–d. Each of the air pipes 130 a–d is supported to overlie a separate row of five filter certridges 66 such that the longitudinal axis of the air pipe is parallel to the tube sheet 68 and lies in a plane containing the center axes of the underlying filter elements. A cylindrical compressed air manifold 132 is mounted transversely of the air pipes 130a–d and is connected to a suitable source of pressurized or compressed air through a connecting hose 134. The manifold 132 serves as a secondary or auxiliary air pressure supply and is interconnected to each of the air pipes 130a–d through corresponding connecting lines or conduits 132a–d and associated diaphragm-type control valves 136a–d. The control valves 136a–d are individually controlled by associated discrete solenoids (not shown) housed within a generally rectangular solenoid control terminal box 138 having suitable connection to an electrical control circuit through an electrical conduit 140.

Each of the air pipes 130a–d has a discharge orifice (not shown) centrally overlying each of the underlying filter elements such that selective opening of the associated control valves 136a–d discharges an air jet pulse downwardly into each of the underlying filter elements. As aforedescribed, a venturi 88 is provided at the upper end of each of the filter cartridges 66 such that a downwardly directed air jet pulse is caused to disperse generally outwardly from the filter axis after passing through the venturi. This causes a pulsed air jet discharge outwardly through the corresponding filter element of predetermined duration so as to dislodge particulate particles which have adhered to the external filter surface 74a.

In addition to the aforedescribed pulsed air jet cleaning of the filter elements during a fill cycle, pressurized air is caused to flow outwardly through the filter elements during "pressurization" and "discharge" cycles of operation in a direction reverse to the direction of normal air flow through the filter elements to the suction line 14 during a fill cycle. This is accomplished by the aforedescribed connection of the air pressure inlet branch 18b to the upper end of the filter containment housing so as to communicate with the region of the filter containment housing above the upper open ends of the filter elements. The combination of reverse air pressure flow during pressurization and discharge phases of operation, and the air pulse jet cleaning effects a dual cleaning mechanism which removes substantially all of the particulate material which has built up on the outside filter surfaces of the filter elements during filling of the transfer vessel. In this manner, each subsequent fill cycle is begun with relatively clean filter elements which maximizes the particle holding capacity of each filter cartridge and results in substantially increased conveying efficiency.

In accordance with another feature of the transfer system 10, bypass means are provided to automatically maintain the discharge pressure within the transfer vessel 12 at a predetermined design pressure so as to prevent plugging of the material outlet line 20. To this end, a modulating bypass conduit 142 is provided between a spool type bypass valve 144 connected in the air pressure inlet line 18 upstream from the control valve 112, and the material outlet conduit 20 downstream from the outlet control valve 122. The bypass valve 144 is controlled between on and off conditions by a bypass valve sensor control 146 which is connected in the pressure inlet line 18 and is operative to sense the pressure within the inlet line and thereby the pressure within the transfer vessel 12. When the pressure within the pressure vessel 12 detected by the sensor control 146 is below optimum, the bypass valve 144 is closed and the entire air flow through the inlet line 18 is directed into the pressure vessel. In this condition, the amount of material forced out of the pressure vessel and through the outlet line 20 is maximized so as to raise the outlet line pressure as it fills with a denser stream of material.

When the sensor control 146 senses a predetermined set point pressure above optimum for the pressure vessel the sensor control sends a signal to the bypass valve 144 to cause it to open and effect air pressure passage through the bypass conduit 142 so as to circumvent the pressure vessel. In this condition, some air and particulate material will continue to flow out of the pressure vessel but it is not replaced by air from the air pressure inlet line 18, thereby causing the pressure within the transfer vessel to drop. As the pressure within the transfer vessel drops, less material is forced into the outlet line 20, although air from the inlet line 18 is maintained at a steady flow in order to continue the conveying process. When the pressure within the pressure vessel, and thus the pressure within the outlet line 20, drops below the bypass set point pressure, the sensor control 146 causes the bypass valve 144 to again close. In this manner, the automatic bypass valve 144 provides a system of negative feedback to the discharging process of the transfer vessel and maintains the pressure within the outlet line 20 at an optimum value so as to preclude plugging of the outlet line. Maximum conveying system efficiency is thereby achieved for a given size transfer vessel and associated components.

A significant advantage of the aforedescribed material transfer system 10 is that all fluid pressure and suction lines to the upper end of the transfer vessel are connected to the sidewall of the filter containment housing, thus enabling removal of the cover lid of the filter containment housing without need for detachment of any components from the cover lid. This allows the height of the pressure vessel and filter containment housing to be maximized when considered with the cover lid removed. In this manner, maximum vessel capacity can be achieved without surpassing maximum height regulations set for over-the-road vehicles, as when transporting one or more of the transfer vessels with their cover lids removed.

While a preferred embodiment of the particulate material transfer system in accordance with the present invention has been illustrated and described, changes and modifications may be made therein without departing from the invention in its broader aspects. Various features of the invention are called for in the following claims.

What is claimed is:

1. In a material transfer system which includes a transfer vessel having upper and lower ends and defining a chamber internally thereof, a supply conduit intersecting the chamber generally adjacent the upper end thereof in a manner to facilitate the introduction of fluid entrained particulate material into the chamber, a discharge conduit intersecting the chamber in a manner to facilitate discharge of particulate material from said chamber, a vacuum conduit intersecting the chamber generally adjacent the upper end thereof in a manner to enable selective drawing of particulate material into the chamber from said supply conduit during a fill cycle, a pressure conduit intersecting the chamber in a manner to enable selective introduction of fluid pressure into the vessel so as to cause discharge of particulate material outwardly through said discharge conduit, and filter means operatively associated with said vessel in a manner to filter out particulate material from fluid drawn from the chamber into the vacuum conduit means during filling of the vessel chamber; the improvement wherein said filter means includes a filter containment housing mounted on the upper end of said vessel so as to extend downwardly into said vessel chamber, said containment housing including an annular wall defining a filter chamber having a lower edge disposed within said vessel chamber at a level below the entry end of said supply conduit, said filter means further including filter element means supported within said filter containment housing above the plane of said lower edge thereof, said filter containment housing having a plurality of openings formed through said annular wall above said lower edge thereof to enable filling of said vessel chamber to a level higher than said lower edge of said containment housing, said annular wall being devoid of openings therethrough in a region juxtaposed to said supply conduit entry end.

2. A material transfer system as defined in claim 1 wherein said openings are generally rectangular.

3. A material transfer system as defined in Claim 1 wherein said annular wall of said filter containment housing extends through an opening in said transfer vessel and is sealingly affixed therein, said containment housing defining a cylindrical internal chamber open at its upper and lower ends and having a longitudinal axis substantially parallel to the longitudinal axis of said transfer vessel, and including a cover lid adapted to be releasibly mounted on the upper end of said annular wall so as to sealingly close said open upper end of said cylindrical internal chamber.

* * * * *